US011675851B2

(12) United States Patent
Garvey et al.

(10) Patent No.: US 11,675,851 B2
(45) Date of Patent: Jun. 13, 2023

(54) STREAMING METHOD FOR THE CREATION OF MULTIFACETED STATISTICAL DISTRIBUTIONS

(71) Applicant: Oracle International Corporation, Redwood Shores, CA (US)

(72) Inventors: Dustin Garvey, Exeter, NH (US); Brent Arthur Enck, Roseville, CA (US); Sampanna Shahaji Salunke, Dublin, CA (US); Uri Shaft, Fremont, CA (US); John Branson Bley, Chapel Hill, NC (US); Timothy Mark Frazier, Livermore, CA (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/479,546

(22) Filed: Sep. 20, 2021

(65) Prior Publication Data

US 2022/0004579 A1    Jan. 6, 2022

Related U.S. Application Data

(63) Continuation of application No. 16/383,426, filed on Apr. 12, 2019, now Pat. No. 11,126,667.

(60) Provisional application No. 62/748,297, filed on Oct. 19, 2018.

(51) Int. Cl.
*G06F 16/906*    (2019.01)
*G06F 16/901*    (2019.01)
*G06F 16/9038*   (2019.01)

(52) U.S. Cl.
CPC ........ *G06F 16/906* (2019.01); *G06F 16/9024* (2019.01); *G06F 16/9038* (2019.01)

(58) Field of Classification Search
CPC . G06F 16/906; G06F 16/9024; G06F 16/9038
See application file for complete search history.

(56) References Cited

U.S. PATENT DOCUMENTS

| 10,073,894 | B2 * | 9/2018  | Yang ................... G06F 16/2465 |
| 2013/0339473 | A1 | 12/2013 | McCaffrey et al. |
| 2014/0078163 | A1 | 3/2014  | Cammert et al. |
| 2015/0033086 | A1 * | 1/2015  | Sasturkar ............. G06F 11/079 714/57 |
| 2015/0293954 | A1 | 10/2015 | Hsiao et al. |
| 2015/0295807 | A1 * | 10/2015 | Huang ................ H04L 41/0677 709/224 |

(Continued)

*Primary Examiner* — Dangelino N Gortayo
(74) *Attorney, Agent, or Firm* — Invoke

(57) ABSTRACT

Generating persistent multifaceted statistical distributions of event data associated with computing nodes is disclosed. From a data stream, events are identified that occur during a first time interval. Characteristics associated with the events are determined. Based on a primary characteristic, it is determined that an event corresponds to an event cluster. The event count for that cluster is incremented. It is determined that the characteristics correspond to an event descriptor of events in the cluster. Responsive to requests to view the event cluster, information about descriptors from the cluster are displayed indicating events having a particular event descriptor, or a summary of characteristics that distinguish the descriptor from other event descriptors.

21 Claims, 4 Drawing Sheets

(56) References Cited

U.S. PATENT DOCUMENTS

| | | | |
|---|---|---|---|
| 2015/0341212 A1* | 11/2015 | Hsiao | H04L 67/75 |
| | | | 715/735 |
| 2016/0239756 A1* | 8/2016 | Aggour | G06F 16/24568 |
| 2017/0132306 A1 | 5/2017 | Brew et al. | |
| 2019/0028501 A1 | 1/2019 | Choudhary et al. | |
| 2019/0294598 A1 | 9/2019 | Hsiao et al. | |
| 2019/0294781 A1* | 9/2019 | Keren | G06F 11/3409 |

* cited by examiner

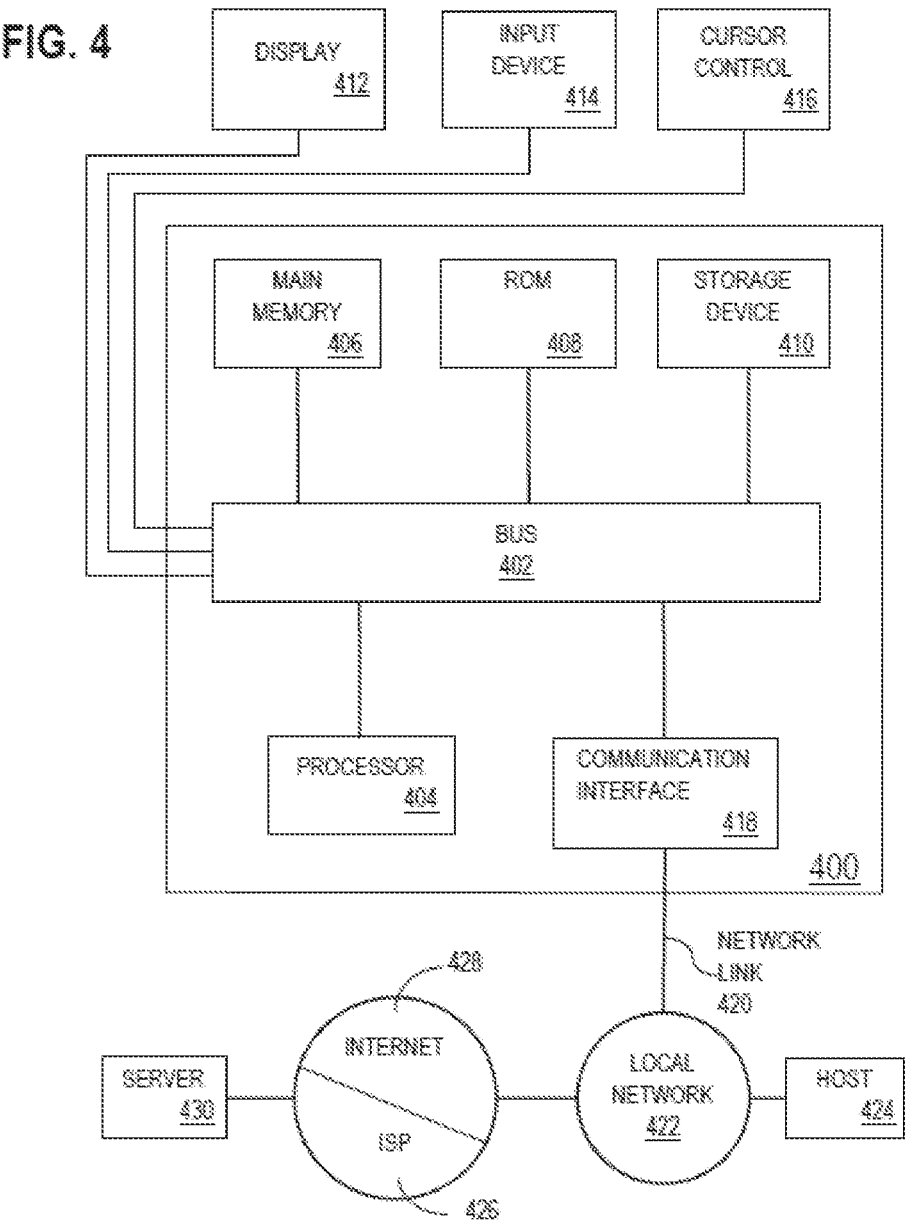

STREAMING METHOD FOR THE CREATION OF MULTIFACETED STATISTICAL DISTRIBUTIONS

INCORPORATION BY REFERENCE; DISCLAIMER

Each of the following applications are hereby incorporated by reference: application Ser. No. 16/383,426 filed on Apr. 12, 2019; application No. 62/748,297 filed on Oct. 19, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to generating persistent multifaceted statistical distributions of event data associated with nodes of a computing system. In particular, the present disclosure relates to a streaming percentile-based data distribution system that retains detailed event data at multiple granularity levels.

BACKGROUND

A computing system includes various nodes. A "node" refers to any hardware and/or software component, such as a physical machine, a virtual machine, an operating system, a firmware program, a middleware program, an application, a web service, and/or a software service.

Each node generates various events. An "event" refers to an occasion in time where the node performs or experiences a certain action that gives rise to measurable event statistics. Examples of events include performance events, failure events, error events, test events, or the like. Events can also be defined in function-specific terms to include download, bootup, shutdown, network transmission events, processing, memory retrieval, and storage functions. A notification of the event is generated, so that an engineer and/or an external application may analyze, resolve, and/or process the event.

A monitoring agent receives streaming data of events. Statistics are generated from the streaming data. These statistics may be rank-based such as the median. These statistics may also include partitioning the incoming streaming data into percentiles, with each data point having an associated percentile value. When datasets get large, it becomes infeasible to store large quantities of data in memory while still efficiently generating the requisite statistics that give an accurate picture of the events occurring on a node.

Accordingly, interest has grown in online approximation algorithms. Some such approximation algorithms are applied to application monitoring use cases. These applications may be limited in that many are designed either to analyze every aspect of a curated data point, or to aggregate certain data points over a limited period of time and to analyze the aggregate values. In other words, approximation algorithms may provide a limited picture that does not provide sufficient detail at certain points, such as at specific sections of a distribution of event data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 is a block diagram that illustrates a computer system upon which an embodiment of the invention may be implemented.

DETAILED DESCRIPTION

Figure 1:
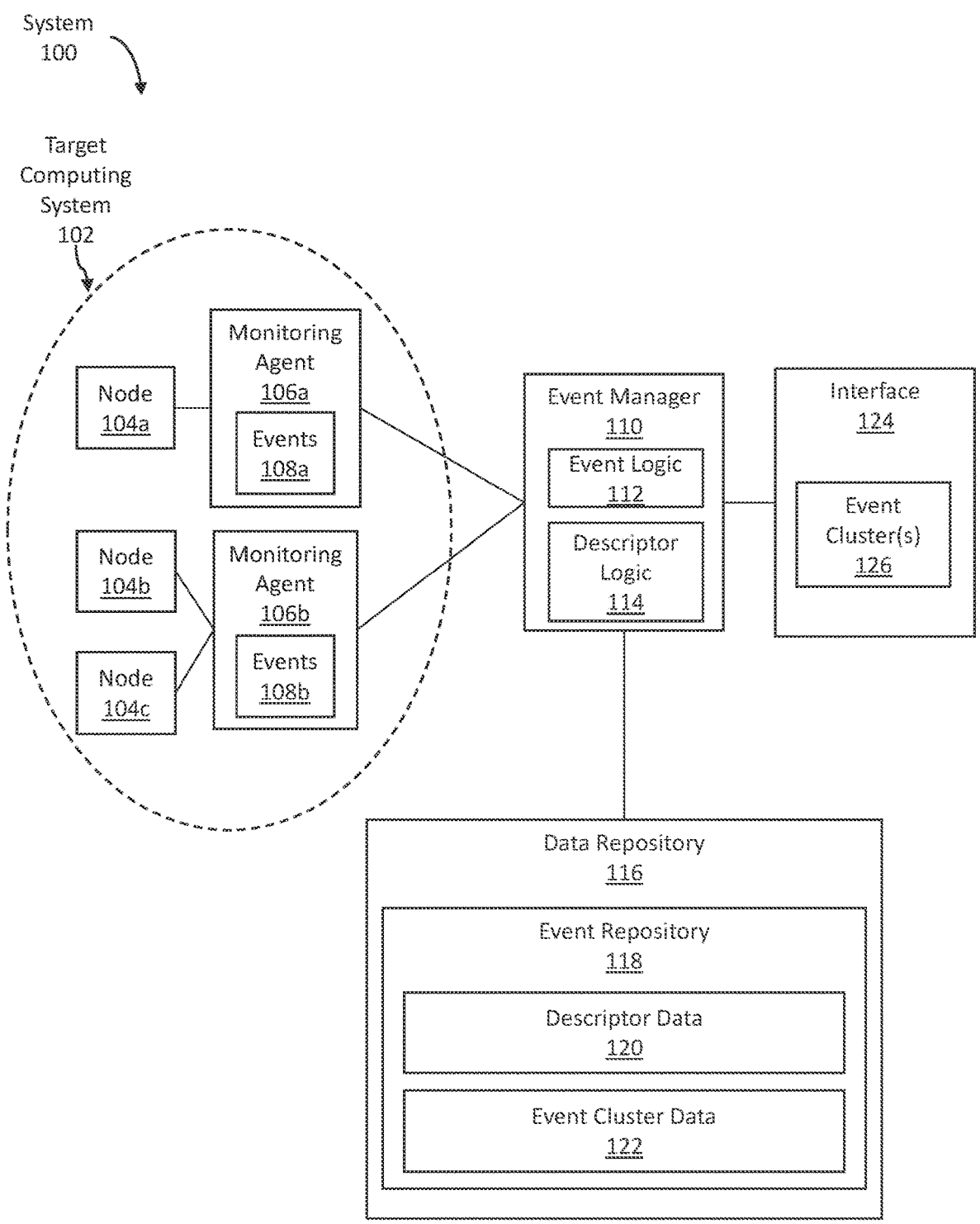
FIG. 1 illustrates a multifaceted statistical distribution system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MULTIFACETED STATISTICAL DISTRIBUTION SYSTEM ARCHITECTURE
3. GENERATING MULTIFACETED EVENT DISTRIBUTIONS AND EVENT DESCRIPTOR DATA SETS FOR CLUSTERED EVENTS
4. MERGING EVENT CLUSTERS ACROSS IDENTIFIED INTERVALS
5. HARDWARE OVERVIEW
6. MISCELLANEOUS; EXTENSIONS

1. General Overview

One or more embodiments include analyzing a data stream from one or more computing nodes. The data stream may be statistically analyzed to partition the data into percentiles, with each data point having an associated percentile value. The data stream is also analyzed to identify particular events (e.g., those that occur during a particular time interval).

An event has one or more characteristics associated with it. Event characteristics describe particular features or statistics of the event. A particular set of characteristics may be observed for a particular event. This set of characteristics may correspond to another set of characteristics for another event. In other words, both events may have the same number and type of associated characteristics. One or more embodiments include recognizing one characteristic of the set of characteristics as a primary characteristic of the event. A primary characteristic may be a specific measurement for an event (e.g., an elapsed time for the event). Events having the same or similar primary characteristic may be clustered together according to the primary characteristic. For example, the primary characteristic may be a numeric value associated with all events of a particular type. Events exhibiting the similar values or levels for a numeric primary characteristic are grouped together. An approximation algorithm may be used to group together events by primary characteristic.

An event cluster is a collection of events that occur on one or more nodes. Events are clustered together based on a correspondence between primary characteristics of the events. For example, two events may exhibit primary characteristics of a similar quantity, value, intensity, or position on a scale. As noted above, an approximation algorithm may generate event clusters based on the primary characteristic.

Each event cluster has a particular count of events associated with the event cluster. A new event may be received from the data stream indicating a certain primary characteristic value. The primary characteristic value is compared to primary characteristic values for the generated event clusters and the event is added to an event cluster where the primary characteristic value for the event corresponds to the primary characteristic value of the event cluster. Accordingly, the event is included within the event cluster and an event count for the event cluster is incremented as a result.

The particular set of characteristics is determined to correspond to a particular event descriptor. An event descriptor comprises a set of characteristics for an event that is stored with the event in the event cluster. The set of characteristics comprising the event descriptor may exclude the primary characteristic. Each time an event is added to an event cluster, it is determined whether the event descriptor for the event corresponds to an existing event descriptor. If so, an event descriptor count for the particular event descriptor is incremented. Otherwise, a new event descriptor is associated to the event cluster. Various statistical measures or artifacts are associated to each event cluster that are generated from the set of event descriptors.

Event clusters can be merged while still maintaining event and event descriptor data. Moreover, merging clusters results in summation of event counts and consolidation of event descriptors from each event cluster. The merged event cluster exhibits a new, combined event count and set of event descriptors. The merged event cluster includes statistical measures generated as a result of the merging of the constituent event clusters. One or more embodiments include consolidating more common event descriptors across event clusters into a single statistical measure.

One or more embodiments include generating an interactive visualization of the event cluster. The event cluster is displayed along with associated event descriptors. Each event descriptor displays associated statistics (e.g., event descriptor count). In response to user input selecting the event cluster (e.g., using a visualization tool), the particular event descriptor is displayed along with other event descriptors associated with the event cluster. Other event-specific information, such as a timestamp of the event, may be discarded.

One or more embodiments described in this Specification and/or recited in the claims may not be included in this General Overview section.

2. Multifaceted Statistical Distribution System Architecture

FIG. 1 illustrates a multifaceted statistical distribution system for streaming data, in accordance with one or more embodiments. As illustrated in FIG. 1, a system 100 includes a target computing system 102, which includes nodes 104a-c and monitoring agents 106a-b. The system 100 further includes an event manager 110, a data repository 116, and an interface 124. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a target computing system 102 is a computing system that is being analyzed. Events occurring on nodes 104a-c in the target computing system 102 are analyzed for any problems that may be occurring within the target computing system 102.

In one or more embodiments, a node (such as any of nodes 104a-c) refers to any hardware and/or software component within a target computing system 102. Examples of nodes include a physical machine, a virtual machine, an operating system, a firmware program, a middleware program, an application, a web service, and/or a software service.

An operation of a target computing environment 102 may be determined by monitoring the target computing environment 102. The network traffic associated with the target computing environment 102 may be monitored. Additionally or alternatively, functions, methods, and/or steps executed by the target computing environment 102 may be monitored. The operation of the target computing environment 102 may indicate which node calls operations of another node, which node provides inputs to another node, which node receives outputs of another node, which node imports code and/or data from another node, and/or which node communicates with another node.

In one or more embodiments, a monitoring agent (such as any of monitoring agents 106a-b) refers to software and/or hardware configured to monitor performance values and/or events associated with one or more nodes 104a-c. The monitoring agent receives event notifications relating to the performance of various functions and/or events associated with the nodes 104a-c. In another embodiment, the monitoring agent generates event notifications and transmits these event notifications to event manager 110. As illustrated, monitoring agent 106a monitors performance and/or events of node 104a. Monitoring agent 106b monitors performance and/or events of node 104b and node 104c. A monitoring agent may be a separate component from the node being monitored. Alternatively, a monitoring agent may be a component within the node being monitored.

An event (such as events 108a-b) may have certain associated characteristics. In one or more embodiments, these event characteristics are used to generate other values such as event descriptors and event statistics, as described in detail with respect to FIG. 2 below. One or more embodiments include identifying a primary characteristic of the event, one that will be used to cluster events together. Additional characteristics form components of an event descriptor for the event.

Primary characteristics may have numeric or non-numeric values, or numeric values that are converted from non-numeric original measurements or observations. In one or more embodiments, event characteristics such as the primary characteristic have values representing an unbounded domain of possible values. In one or more embodiments, other event-specific information (e.g., timestamp values) is not stored. As the data stream continues to provide additional data including additional events, this event-specific information is discarded.

One or more embodiments include that an event may be determined to occur each time a node performs a specific function. The node may be, for example, a web server configured to receive requests for web pages (e.g., as an HTTP request) and transmit web pages and associated data (e.g., as an HTTP response). Accordingly, each time a node serves a page in response to a request, an event notification may be generated and transmitted to monitoring agent 106a or monitoring agent 106b. The request may include one or more features of the request. For example, a request for a web page or web content may include request features. Examples of request features include requesting browser name identifiers, browser version identifiers, operating system name (e.g., for the operating system of the computing device that originated the request), operating system version, requested URL, geographic region corresponding to the request, and an electronic address of the requestor. One or more of these request features may later be termed event characteristics that collectively comprise an event descriptor.

As another example, an event may occur when an availability of a node falls below a threshold value. As another example, an event may occur when a response time of a node exceeds a threshold value. As another example, an event may occur when a security threat of a particular type is detected. As illustrated, monitoring agent 106a determines that events 108a have occurred. Monitoring agent 106b determines that events 108b have occurred.

In one or more embodiments, a data repository 116 is any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or may execute on the same computing system as an event manager 110. Alternatively or additionally, a data repository 116 may be implemented or executed on a computing system separate from an event manager 110. The data repository 116 may be communicatively coupled to the event manager 110 via a direct connection or via a network.

Information describing an event repository 118 may be implemented across any of components within the system 100. However, this information is illustrated within the data repository 116 for purposes of clarity and explanation.

In one or more embodiments, an event repository 118 refers to information indicating events that occur on a set of nodes 104a-c in a target computing system 102. As described above, events may include performance events, security events, functional events, error events, and the like. The event repository 118 indicates an overall architecture and/or arrangement of the nodes 104a-c. The event repository 118 may store event information in various forms, such as a mathematical event distribution, or an event digest.

In an embodiment, descriptor data 120 includes data corresponding to one or more event characteristics for an event. An event descriptor is generated using the combination of event characteristics received in association with the event and stored as descriptor data 120.

An event occurring on one or more nodes of a target computing environment 102 may involve more than one node of nodes 104a-c. For example, node 104a may be an application server, and node 104b may be a data storage server. A web response event may require that the application server of node 104a perform certain application functions that use data from the data storage server of node 104b in order to generate the response that forms the web response event. The interaction between the two nodes may affect, for example, a response time of the web response event.

In one or more embodiments, an event manager 110 refers to hardware and/or software configured to perform operations described herein for generating event descriptors and providing event descriptor information in conjunction with event clusters. Examples of operations for generating event descriptors and providing event descriptor information in conjunction with event clusters are described below with reference to FIG. 2.

An event manager 110 may include event logic 112. Event logic 112 may be configured to identify events from a data stream, identify corresponding event clusters and whether a new event cluster should be generated, and identify event characteristics. Descriptor logic 114 may be configured to generate an event descriptor for each event and store the event descriptor in an event repository 118 based on event information. Event logic 112 and descriptor logic 114 may be implemented in separate modules or components from each other. Alternatively, event logic 112 and descriptor logic 114 may be implemented within the same module or component.

In an embodiment, an event manager 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, an interface 124 refers to hardware and/or software configured to facilitate communications to and/or from an event manager 110. In an embodiment, an interface 124 may include a user interface, an application interface, or both.

In an embodiment, an interface 124 is a user interface configured to facilitate communications between an event manager 110 and a user. A user interface outputs information in the form of user interface elements, and/or receives input of information via user interface elements. Examples of user interfaces include a graphical user interface (GUI), a command line interface (CLI), a haptic interface, and a voice command interface. Examples of user interface elements include text, graphic, checkboxes, radio buttons, dropdown lists, list boxes, buttons, toggles, text fields, date and time selectors, command lines, sliders, pages, and forms.

In an embodiment, an interface 124 is an application interface configured to facilitate communications between an event manager 110 and one or more applications. An application interface (such as an application programming interface (API)) may facilitate communications based on one or more communications protocols, such as Hypertext Transfer Protocol (HTTP). A communication protocol may conform with a Representational State Transfer (REST) architectural style.

In one or more embodiments, interface 124 includes information describing event clusters 126. Information describing event clusters 126 may be implemented across any of components within the system 100. However, this information is illustrated within the interface 124 for purposes of clarity and explanation.

In an embodiment, an event cluster 126 includes a first event and a second event that both indicate an overlap or correspondence in primary characteristic values. For example, both the first event and the second event may have a time-based value that lies within specific threshold values. As a specific example, a first web response event may have an associated first response time (e.g., in milliseconds) during which a node, such as node 102*a*, processed or fulfilled a request for web content. A second web response event may also have an associated second response time (e.g., in milliseconds) during which node 102*a* processed or fulfilled a request for web content. In one embodiment, both the first response time and the second response time may lie within specific response time thresholds. Accordingly, the first web response event and the second web response event may be included within a particular event cluster 126.

3. Generating Multifaceted Event Distributions and Event Descriptor Data Sets for Clustered Events FIG. 2 illustrates an example set of operations for generating multifaceted event distributions and event descriptor data sets for clustered events, in accordance with one or more embodiments.

Figure 2:
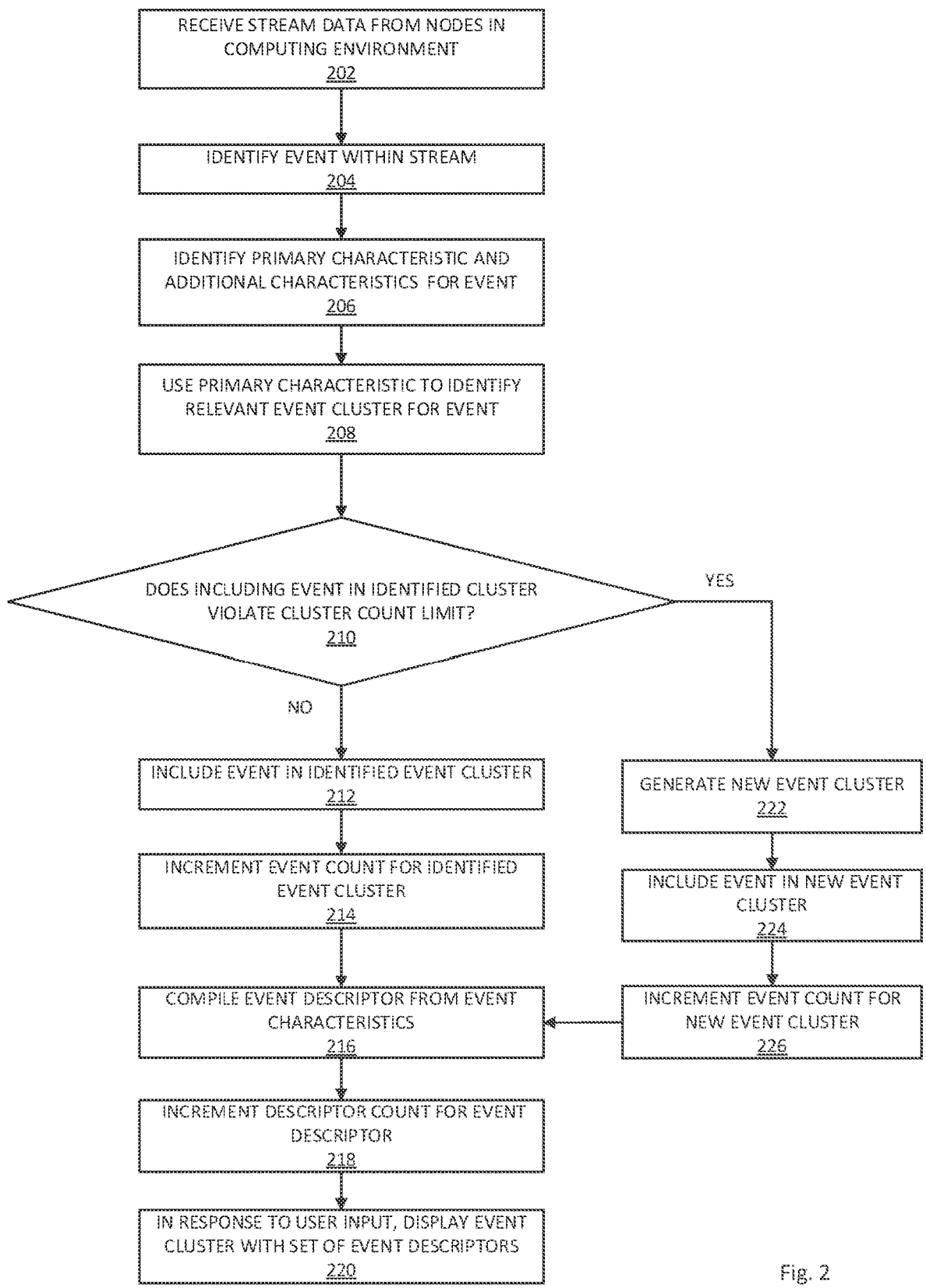
FIG. 2 illustrates an example set of operations for generating multifaceted event distributions and event descriptor data sets for clustered events, in accordance with one or more embodiments.

One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include obtaining information associated with a current event (Operation 202). Data from one or more nodes (e.g., nodes 102*a-c* shown in FIG. 1) is received. For example, data is received as a stream and is continuously ordered into a frequency distribution of data points, also referred to herein as an event data distribution.

The event data distribution may be arranged by specific primary characteristics associated with events. These primary characteristics may be numeric, non-numeric, or numeric as converted from non-numeric measurements. In one or more embodiments, the data stream comprises events (e.g., web response events for web response functions performed by one or more of nodes 102*a-c*).

The frequency distribution may be represented in terms of percentile values, with each incoming data point (e.g., an event) in the stream being assigned a percentile value. In one or more embodiments, an approximation of the distribution is generated using algorithms such as a t-digest algorithm.

One or more embodiments include clustering events into particular event clusters that are defined according to particular primary characteristics associated with each event. For example, a web response event may have a primary characteristic that represents web response time (e.g., the time taken for the requested web content to be transmitted to the requestor, such as a browser). A web response event may have a primary characteristic representing page load time (e.g., the measured time taken for a requested web page to load on a browser at a requesting computer).

Events associated with a set of nodes in a target computing system are monitored. A particular event associated with a particular node satisfies certain criteria. A current event is determined to have occurred (Operation 204). A notification of the current event is generated. The event notification includes a primary characteristic associated with the current event. A primary characteristic may represent a performance value, such as a web response time or page load time.

One or more embodiments include determining the primary characteristic and additional event characteristics for the event from the notification received within the data stream. (Operation 206). The event notification may adhere to a specific notification format. Determining the primary characteristic and additional event characteristics includes analyzing or parsing the event notification according to the specific format.

One or more embodiments include using the primary characteristic to identify an event cluster in which the event should be placed (Operation 208). Events are grouped into event clusters according to an associated primary characteristic. For example, the primary characteristic may be numeric, and the event clusters may be defined according to specific numeric values for the primary characteristic (e.g., an average, a sum, a count, and so on).

One or more embodiments include comparing the primary characteristic for an incoming event from a data stream with primary characteristic quantities associated with the event clusters defining the event data distribution. When the primary characteristic for an event corresponds to a primary characteristic for an event cluster, the event is assigned that event cluster. Accordingly, an event's position on the event data distribution is represented by the event cluster for that event.

A candidate event cluster is identified, based on a match between the primary characteristic associated with the event and a primary characteristic value associated with the candidate event cluster. For example, the new event may be a page load event, with an associated primary characteristic represented by a page load time. The page load time may be a numeric quantity, such as 145 ms. A candidate event cluster may have an associated primary characteristic averaging of 150 ms. Accordingly, the new event's primary characteristic may be said to correspond closely to that of the candidate event cluster and the new event is assigned the candidate event cluster in the event data distribution.

In one or more embodiments, the event clusters may represent approximations generated using an approximation algorithm. More specifically, an approximation algorithm such as a t-digest algorithm may be configured to construct an approximation of all event data along a distribution given specific primary characteristic constraints.

For example, a t-digest algorithm may be configured to take streaming event data for page load time events and cluster the data into event clusters defined by page load time values (e.g., 100 ms, 200 ms, and so on). The t-digest algorithm may be configured to generate such clusters as approximations of the streaming event data rather than exact reproductions of the data stream.

In one or more embodiments, the t-digest algorithm is configured to generate larger event clusters in the middle of a distribution and relatively smaller event clusters at the leading and trailing ends of the distribution. For example, an event data distribution for page load time events may represent a variety of time periods taken for a particular page to load. A large number of these page load time events may resolve to an average or median page load time value, whereas a somewhat smaller number of page load time events may represent either unusually fast or unusually slow load times.

The unusually faster or slower page load times may be represented at the leading and trailing ends of an event data distribution for page load times. Leading and trailing ends of an event data distribution may be of greater interest to a data reviewer. Accordingly, more granular clustering is performed at the leading and trailing ends in order to provide a more detailed view of unusual events as described above.

In one or more embodiments, each event cluster is generated with a defined event cluster count limit. As noted above, the event cluster count limit may be higher for event clusters determined to be nearer the center of the event data distribution. For event clusters nearer to the leading and trailing ends of the event data distribution, the event cluster count limit may be relatively lower.

One or more embodiments include determining the event cluster count limit for an event cluster before assigning a new event to the event cluster (Operation 210). A candidate event cluster is identified, based on a correspondence between the primary characteristic associated with the event and a primary characteristic associated with the candidate event cluster.

If there is a correspondence between primary characteristic values of the event and the candidate event cluster, it is determined whether the event cluster count limit has been reached. If the event cluster count limit has not been reached, the event is assigned the event cluster that is matched according to the primary characteristic. If the event cluster count limit has already been reached, a new event cluster is generated and assigned to the new event.

One or more embodiments include determining that the event cluster count limit has not been reached for the identified candidate event cluster. The new event is included within the identified event cluster. (Operation 212). As a result, the event count for the event cluster is incremented to reflect inclusion of the new event. (Operation 214).

One or more embodiments include determining that the event cluster count limit has been reached for the identified candidate event cluster. Accordingly, additional event instances will not be included within the identified candidate event cluster. Instead, one or more embodiments include generating a new event cluster. (Operation 222). The new event is included within the newly generated event cluster (Operation 224). As a result, the event count for the newly generated event cluster is incremented to reflect inclusion of the new event. (Operation 226).

One or more embodiments include analyzing the event characteristics for the new event to generate an event descriptor (Operation 216). As used herein, "event descriptor" refers to a set or combination of event characteristics whose statistics (e.g., count) are stored with the event cluster. For example, a page load event may have an associated set of event characteristics that include browser name identifiers, browser version identifiers, operating system name (e.g., for the operating system of the computing device that originated the page request), operating system version, requested URL, geographic region corresponding to the request, and an electronic address of the requestor. The event descriptor is compiled using the event characteristics.

The compiled event descriptor is compared to existing event descriptors associated with the event cluster. For example, for a page load time event, an event descriptor may be represented as "google chrome, 50.0.2661.94. Windows, 7, US. URL". In this example, the event descriptor includes event characteristics such as browser identifier, browser version, operation system identifier, operating system version, geographic region of origin for the request, and requested URL. If the set of event descriptors for the event cluster already includes the same event descriptor, the abovementioned event descriptor is included within the set of event descriptors for the event cluster and the event descriptor count is incremented for that event descriptor. If the set of descriptors for the event cluster does not include the abovementioned event descriptor, then this new event descriptor is included within the set of event descriptors for the event cluster with a new event descriptor count.

One or more embodiments include incrementing the event descriptor count for the event descriptor (Operation 218). As the data stream flows, the event cluster maintains a set of event descriptors. The set of event descriptors may include, for example, an event descriptor such as "google chrome, 50.0.2661.94. Windows, 7, US. URL". One or more embodiments include that the aforementioned event descriptor may be associated with a certain count of existing events associated within the event cluster. When the new event is determined to be included with the identified event cluster, the event's characteristics are identified as the abovementioned event descriptor.

In other embodiments, the specific combination of characteristics that resolve to the event descriptor may not have been observed previously. Accordingly, the new event descriptor is included within the set of descriptors for the event cluster. The event descriptor count for the descriptor is incremented.

One or more embodiments include consolidating similar event descriptors into a single event descriptor. In an embodiment, event clusters that lie near the center of an event data distribution are determined to be candidate event clusters for descriptor consolidation. One or more embodiments also include minimizing descriptor consolidation at the leading-trailing tails of the distribution. For any particular event cluster near the center of the event data distribution, the event descriptor count is capped at a predefined level. As more and more events are assigned to the cluster, the event descriptor count does not increase beyond the cap level. Instead, similar event descriptors are consolidated into a single event descriptor.

In an embodiment, the single event descriptor displays the most common individual event characteristics that form the event descriptor. In another embodiment, the single event descriptor displays no event characteristic data. For example, the single event descriptor may just show the event descriptor count and simply display "Unknown, unknown, unknown, unknown" for the event characteristics. In an embodiment, a maximum memory size may be defined for the set of event descriptors for each event cluster. Once the memory size is reached, one or more embodiments include one or more of limiting the event descriptor count to a predefined cap and consolidating multiple event descriptors into a single event descriptor.

In one embodiment, a visualization tool is provided that displays an event cluster using an interactive graphical display that shows one or more graphical objects. The one or more graphical objects may include, for example, a histogram. The event cluster may be displayed, for example, as part of a histogram of values of the primary characteristic. As a more specific example, the event cluster may correspond to a series of page load time events. The histogram may plot page load time on an x-axis and page view counts on a y-axis. The histogram displays a plurality of event clusters, with larger event clusters near a center of the histogram and smaller and more granular event clusters at the leading and trailing ends of the histogram. Relatedly, each time a new event cluster is generated, a new histogram is initialized for event descriptors of the new event cluster.

One or more embodiments include receiving user input to provide an event cluster with its associated set of event descriptors (Operation 220). For example, a user may select a particular event cluster from a histogram of an event data distribution being displayed using the abovementioned visualization tool. Responsive to the selection of the event cluster, the set of event descriptors associated with the histogram is displayed. Selection of the event cluster causes the display to show details including the associated event descriptors, event cluster count values, primary characteristic values, and any individual additional characteristic values.

4. Merging Event Clusters Across Identified Intervals

Figure 3:
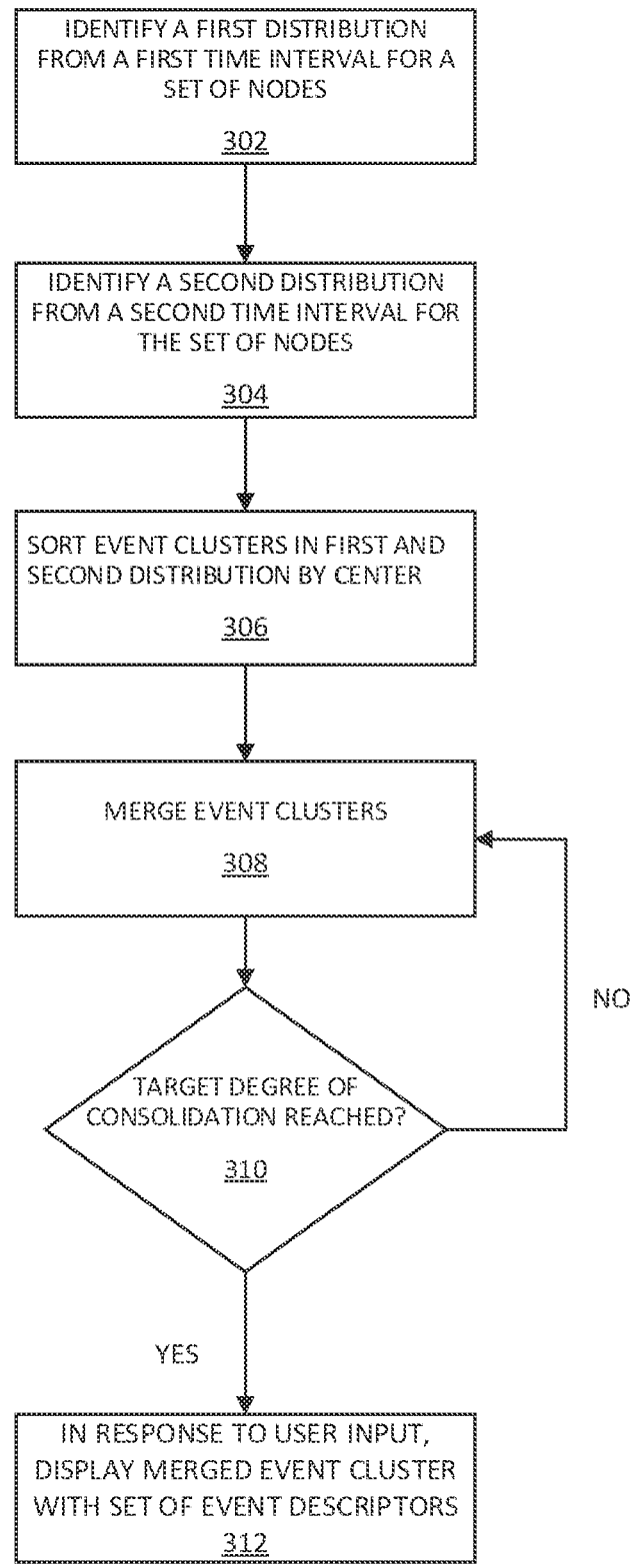
FIG. 3 illustrates an example set of operations for merging event clusters across identified time intervals, in accordance with one or more embodiments.

FIG. 3 illustrates an example set of operations for merging event clusters across identified time intervals, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include identifying a plurality of event data distributions from different time intervals for a set of nodes. The same set of nodes may perform the same function over time and observable event data will be streamed over different time intervals and can be used to create event data distributions. For example, a set of nodes may perform page load functions for a one-hour period. The one-hour period may be divided into 60 time intervals of one minute each. For each one-minute time interval, the streaming event data is processed as an event data distribution as described above.

In one or more embodiments, the event data distribution is based on the primary characteristic of the events. Events are clustered using the primary characteristic. Multiple time intervals will be represented by event data distributions that have event clusters that have the same or similar primary characteristic values. Where event clusters across different event data distributions have overlapping primary characteristic values, these event clusters are merged across event data distributions from different time intervals.

One or more embodiments include a first event data distribution from a first time interval for a set of nodes (e.g., nodes 102a-c) (Operation 302). An event data distribution may include multiple event clusters, each identified using a primary characteristic. For example, an event data distribution may include event clusters identified according to a center value. The center value may be an average value or centroid value. In one or more embodiments, an approximation algorithm generates the centroid value as an abstraction or high-fidelity approximation of the actual event data that comprises the event data distribution.

One or more embodiments include identifying a second event data distribution from a second time interval for the set of nodes (Operation 304). As noted above, the operations illustrated by FIG. 3 do not limit the scope of one or more embodiments described herein. For example, one or more embodiments may include identifying a plurality of event data distributions from a plurality of time intervals for a set of nodes.

One or more embodiments include sorting the event clusters from the first event data distribution and the second data distribution (Operation 306). One or more embodiments include sorting the event clusters from the event data distributions according to a center value for each event cluster. For example, the first event data distribution may include event clusters represented by center values 33, 51, and 68. The second event data distribution may include event clusters represented by center values 31, 77, 92. The event clusters from both event data distributions are sorted according to their center values. For example, the sorted event clusters may be listed as 31, 33, 51, 68, 77, 92.

One or more embodiments include merging the event clusters according to their center values (Operation 308). Using the abovementioned example, the event clusters may be merged to result in merged event clusters with center values 32, 59, 85.

In another embodiment, the first event data distribution may include event clusters represented by center values 33, 51, 68, and 2076. The second event data distribution may include event clusters represented by center values 31, 77, 92. The event clusters from both event data distributions are sorted according to their center values. For example, the sorted event clusters may be listed as 31, 33, 51, 68, 77, 92, 2076.

Merging these event clusters may result in merged event clusters 32, 59, 85, 2076. It can be seen that certain event clusters from one event data distribution may not have center values that are comparable to event clusters from another event data distribution. Outlying event clusters may not be merged into event clusters from other event data distributions.

One or more embodiments include determining whether a target degree of event cluster merger or event cluster consolidation has been reached (Operation 310). In an embodiment, all event clusters of one event data distribution are sorted against event clusters from a plurality of event data distributions in order to determine merger possibilities.

For example, all event clusters from one or more event data distributions have been sorted and merged as described above with respect to Operations 306 and 308. It is determined that a target event cluster consolidation level has not been reached. The merger operation may then be repeated to determine whether the merged event clusters can be merged further. It is determined again whether a target event cluster consolidation level has been reached.

As another example, all event clusters from one or more event data distributions are sorted and merged as described above with respect to Operations 306 and 308. It is then determined that a target event cluster consolidation level has been reached. The merger operation is no longer repeated.

One or more embodiments include combining event counts for the event clusters that are merged together to form the merged event cluster. For example, the first event data distribution described above to include event clusters represented by center values 33, 51, and 68 has first event count values for each event cluster represented by the above center values. The second event data distribution described above to include event clusters represented by center values 31, 77, 92 has second event count values for each event cluster represented by the above center values.

The first event count values and second event count values are combined so as to correspond to the event cluster center values. For example, an event cluster with center value 33 and event count value 100 and an event cluster with the center value 31 and event count value 120 is merged to form the merged event cluster with center 32 and a combined event count value of 120.

One or more embodiments include merging event descriptors to generate a merged set of event descriptors for the merged event cluster. For example, the first event data distribution may have event data clusters with a first set of event descriptors that includes the following three event descriptors:
"google chrome, 50.0.2661.94, Windows, 7, US, URL123456"
"google chrome, 49.0.2623.112, Windows, 7, FR, URL123456"
"google chrome, 50.0.2661.94, Windows, 7, EN, URL123456"

Continuing with the above example, the second event data distribution may have event data clusters with a second set of event descriptors that includes the following four event descriptors:

"google chrome, 50.0.2661.94, Windows, 7, US, URL123456"
"google chrome, 49.0.2623.112, Windows, 7, FR, URL123456"
"google chrome, 50.0.2661.94, Windows, 7, EN, URL123456"
"firefox, 45.0, Windows, 7, US, URL123456"

Accordingly, the first and second sets of event descriptors are merged to form the following merged third set of event descriptors for the merged event cluster:
"google chrome, 50.0.2661.94, Windows, 7, US, URL123456"
"google chrome, 49.0.2623.112, Windows, 7, FR, URL123456"
"google chrome, 50.0.2661.94, Windows, 7, EN, URL123456"
"firefox, 45.0, Windows, 7, US, URL123456"

As shown above, the merged third set of event descriptors merges the first three event descriptors. However, the fourth event descriptor in the second set of event descriptors does not have a corresponding event descriptor in the first set of event descriptors. Accordingly, the fourth event descriptor is carried over into the merged third set of event descriptors. One or more embodiments include combining the event descriptor count when the event clusters are merged to form the merged event cluster.

One or more embodiments include displaying, in response to user input, a merged event cluster with its set of event descriptors (Operation 312). For example, a user may select a particular merged event cluster from a histogram of an event data distribution being displayed using the abovementioned visualization tool. Responsive to the selection of the merged event cluster, the set of merged event descriptors associated with the histogram is displayed.

As described with respect to Operation 220 of FIG. 2, in one embodiment, a visualization tool is provided that can display the merged event cluster using an interactive graphical display that shows one or more graphical objects. The one or more graphical objects may include, for example, a histogram. The merged event cluster may be displayed, for example, as part of a histogram of values of the primary characteristic. As a more specific example, the merged event cluster may correspond to a series of page load time events. The histogram may plot page load time on an x-axis and page view counts on a y-axis. The histogram displays the plurality of merged event clusters, with larger merged event clusters near a center of the histogram and smaller and more granular merged event clusters at the leading and trailing ends of the histogram.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium storing instructions which, when executed by one or more hardware processors, cause performance of operations comprising:
   identifying, from a data stream, a first plurality of events that occur during a first time interval on a set of nodes in a computing environment;
   ordering the events, in the first plurality of events, in an event distribution;
   partitioning the first plurality of events into a plurality of event clusters based on respective characteristics of each event in the first plurality of events;
   wherein a first event descriptor is associated with one or more events in the first event cluster of the plurality of clusters and a second event descriptor is associated with one or more events in a second event cluster of the plurality of event clusters;
   responsive at least to determining that events in the first event cluster and events in the second event cluster are less than a particular distance from a center of the event data distribution:
      classifying the first event cluster and the second event cluster as candidate event clusters for descriptor consolidation;
      merging the first event cluster and the second event cluster into a third event cluster, wherein a third event descriptor is associated with one or more events in the third event cluster;
   responsive to receiving user input requesting to view a data set comprising the third event cluster, displaying information about the third event descriptor that is associated with the one or more events in the third event cluster;

identifying a fourth event cluster and a fifth event cluster of the plurality of event clusters;

responsive at least to determining that events in the fourth event cluster and events in the fifth event cluster are more than the particular distance from the center of the event data distribution, refraining from classifying the fourth event cluster and the fifth event cluster as candidate event clusters for descriptor consolidation.

2. The medium of claim 1, wherein the third event descriptor is based on at least one of the first event descriptor and the second event descriptor.

3. The medium of claim 1, wherein merging the first event cluster and the second event cluster is further based on determining that the first event cluster shares one or more attributes with the second event cluster.

4. The medium of claim 1, wherein merging the first event cluster and the second event cluster comprises:
generating a combined event count comprising a first event count associated with the first event cluster and a second event count associated with the second event cluster; and
storing the combined event count in association with the third event cluster.

5. The medium of claim 1, wherein the operations further comprise minimizing descriptor consolidation at the leading-trailing tails of the event distribution.

6. The medium of claim 1, wherein the operations further comprise implementing a cap for an event descriptor count for a particular event cluster that is less than the particular distance from the center of the event data distribution.

7. The medium of claim 1, wherein the operations further comprise: prior to merging, adding a particular event to the first event cluster based on characteristics of the particular event, wherein adding the particular event comprises incrementing an event descriptor count for the first event descriptor associated with the first event cluster.

8. A method comprising:
identifying, from a data stream, a first plurality of events that occur during a first time interval on a set of nodes in a computing environment;
ordering the events, in the first plurality of events, in an event distribution;
partitioning the first plurality of events into a plurality of event clusters based on respective characteristics of each event in the first plurality of events;
wherein a first event descriptor is associated with one or more events in the first event cluster of the plurality of clusters and a second event descriptor is associated with one or more events in a second event cluster of the plurality of event clusters;
responsive at least to determining that events in the first event cluster and events in the second event cluster are less than a particular distance from a center of the event data distribution:
classifying the first event cluster and the second event cluster as candidate event clusters for descriptor consolidation;
merging the first event cluster and the second event cluster into a third event cluster, wherein a third event descriptor is associated with one or more events in the third event cluster;
responsive to receiving user input requesting to view a data set comprising the third event cluster, displaying information about the third event descriptor that is associated with the one or more events in the third event cluster;

identifying a fourth event cluster and a fifth event cluster of the plurality of event clusters;

responsive at least to determining that events in the fourth event cluster and events in the fifth event cluster are more than the particular distance from the center of the event data distribution, refraining from classifying the fourth event cluster and the fifth event cluster as candidate event clusters for descriptor consolidation;

wherein the method is performed by at least one device including a hardware processor.

9. The method of claim 8, wherein the third event descriptor is based on at least one of the first event descriptor and the second event descriptor.

10. The method of claim 8, wherein merging the first event cluster and the second event cluster is further based on determining that the first event cluster shares one or more attributes with the second event cluster.

11. The method of claim 8, wherein merging the first event cluster and the second event cluster comprises:
generating a combined event count comprising a first event count associated with the first event cluster and a second event count associated with the second event cluster; and
storing the combined event count in association with the third event cluster.

12. The method of claim 8, wherein the operations further comprise minimizing descriptor consolidation at the leading-trailing tails of the event distribution.

13. The method of claim 8, wherein the operations further comprise implementing a cap for an event descriptor count for a particular event cluster that is less than the particular distance from the center of the event data distribution.

14. The method of claim 8, wherein the operations further comprise: prior to merging, adding a particular event to the first event cluster based on characteristics of the particular event, wherein adding the particular event comprises incrementing an event descriptor count for the first event descriptor associated with the first event cluster.

15. A system comprising:
at least one device including a hardware processor;
the system being configured to perform operations comprising:
identifying, from a data stream, a first plurality of events that occur during a first time interval on a set of nodes in a computing environment;
ordering the events, in the first plurality of events, in an event distribution;
partitioning the first plurality of events into a plurality of event clusters based on respective characteristics of each event in the first plurality of events;
wherein a first event descriptor is associated with one or more events in the first event cluster of the plurality of clusters and a second event descriptor is associated with one or more events in a second event cluster of the plurality of event clusters;
responsive at least to determining that events in the first event cluster and events in the second event cluster are less than a particular distance from a center of the event data distribution:
classifying the first event cluster and the second event cluster as candidate event clusters for descriptor consolidation;
merging the first event cluster and the second event cluster into a third event cluster, wherein a third event descriptor is associated with one or more events in the third event cluster;

responsive to receiving user input requesting to view a data set comprising the third event cluster, displaying information about the third event descriptor that is associated with the one or more events in the third event cluster;

identifying a fourth event cluster and a fifth event cluster of the plurality of event clusters;

responsive at least to determining that events in the fourth event cluster and events in the fifth event cluster are more than the particular distance from the center of the event data distribution, refraining from classifying the fourth event cluster and the fifth event cluster as candidate event clusters for descriptor consolidation;

wherein the method is performed by at least one device including a hardware processor.

16. The system of claim 15, wherein the third event descriptor is based on at least one of the first event descriptor and the second event descriptor.

17. The system of claim 15, wherein merging the first event cluster and the second event cluster is further based on determining that the first event cluster shares one or more attributes with the second event cluster.

18. The system of claim 15, wherein merging the first event cluster and the second event cluster comprises:

generating a combined event count comprising a first event count associated with the first event cluster and a second event count associated with the second event cluster; and storing the combined event count in association with the third event cluster.

19. The system of claim 15, wherein the operations further comprise minimizing descriptor consolidation at the leading-trailing tails of the event distribution.

20. The system of claim 15, wherein the operations further comprise implementing a cap for an event descriptor count for a particular event cluster that is less than the particular distance from the center of the event data distribution.

21. The system of claim 15, wherein the operations further comprise: prior to merging, adding a particular event to the first event cluster based on characteristics of the particular event, wherein adding the particular event comprises incrementing an event descriptor count for the first event descriptor associated with the first event cluster.

* * * * *